United States Patent

Cavo et al.

[11] Patent Number: 5,141,650
[45] Date of Patent: Aug. 25, 1992

[54] PRESSURE SCREEN

[75] Inventors: John D. Cavo; Jack Mize, both of Ft. Lauderdale, Fla.

[73] Assignee: County Line Sand & Gravel, Inc., Fort Lauderdale, Fla.

[21] Appl. No.: 687,206

[22] Filed: Apr. 18, 1991

Related U.S. Application Data

[63] Continuation of Ser. No. 416,955, Oct. 4, 1989, abandoned.

[51] Int. Cl.⁵ .............................................. C02F 1/00
[52] U.S. Cl. .................................. 210/741; 209/273; 209/281; 210/112; 210/147; 210/162; 210/170; 210/241; 210/295; 210/320; 210/454
[58] Field of Search ............... 210/162, 170, 241, 295, 210/320, 435, 454, 456, 106, 109, 111, 112, 137, 433.1, 741, 147; 209/273, 274, 281

[56] References Cited

U.S. PATENT DOCUMENTS

| | | | |
|---|---|---|---|
| 1,525,449 | 2/1925 | Johnson | 210/415 |
| 3,256,995 | 6/1966 | Schmid et al. | 210/415 |
| 4,043,919 | 8/1977 | Hutzler | 210/415 |
| 4,220,540 | 9/1980 | Hagihara | 210/415 |
| 4,250,034 | 2/1981 | Wolters | 210/170 |
| 4,605,497 | 8/1986 | Araoka et al. | 210/162 |
| 4,626,349 | 12/1986 | Uphus | 210/456 |
| 4,692,253 | 9/1987 | Otake et al. | 210/111 |
| 4,744,896 | 5/1988 | James et al. | 210/170 |

*Primary Examiner*—Charles Hart
*Attorney, Agent, or Firm*—Malin, Haley, McHale, DiMaggio & Crosby

[57] ABSTRACT

A portable pressure screen apparatus is disclosed having a cylindrical shaped pressure housing defining upper and lower hingedly connected halves. The housing includes a slurry inlet aperture raised relative to a filtered slurry discharge port situated at the opposite end of the pressure housing from the slurry inlet aperture. A screen spans the interior of the housing, separating the interior into an upper chamber and a lower chamber. Collected particulate matter from the slurry inlet aperture is accumulated in the upper chamber and slurry filtered through the screen leaves the interior of the housing through the filtered slurry discharge port connected to the lower chamber. A support frame is employed to adjustably support the housing in a generally angled attitude relative to the horizontal. Angling the housing at an acute angle with respect to the horizontal causes the unfiltered slurry to be exposed to the entire length of the screen causing particulate matter larger than the opening in the screen to be accumulated in the upper chamber above the screen and drawn down the screen toward a particulate matter discharge port by gravity. The particulate matter discharge port is selectively openable or closable during operation of the device in response to the sensed pressure differential between the upper and lower chambers caused by accumulated particulate matter too large to pass through the screen.

7 Claims, 4 Drawing Sheets

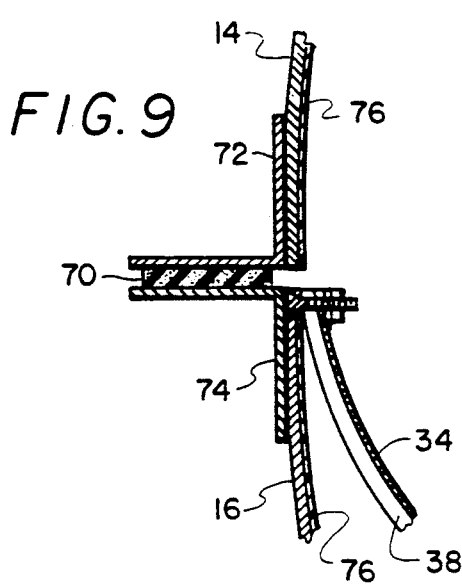
FIG. 9
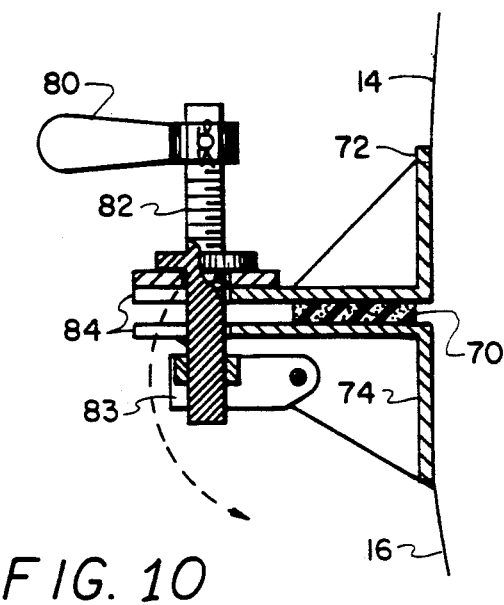
FIG. 10
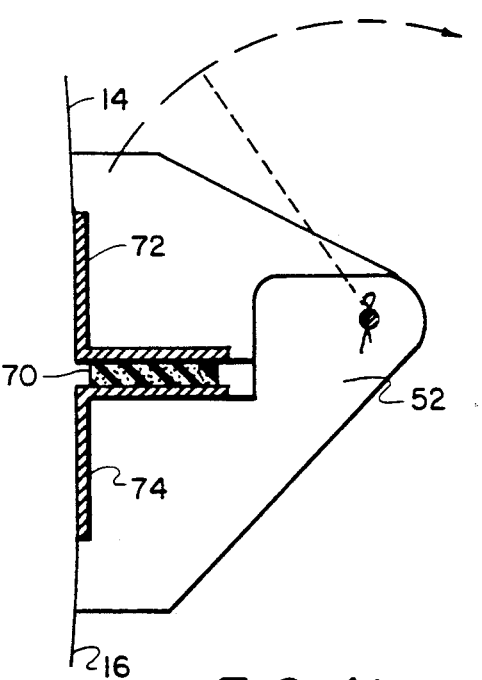
FIG. 11
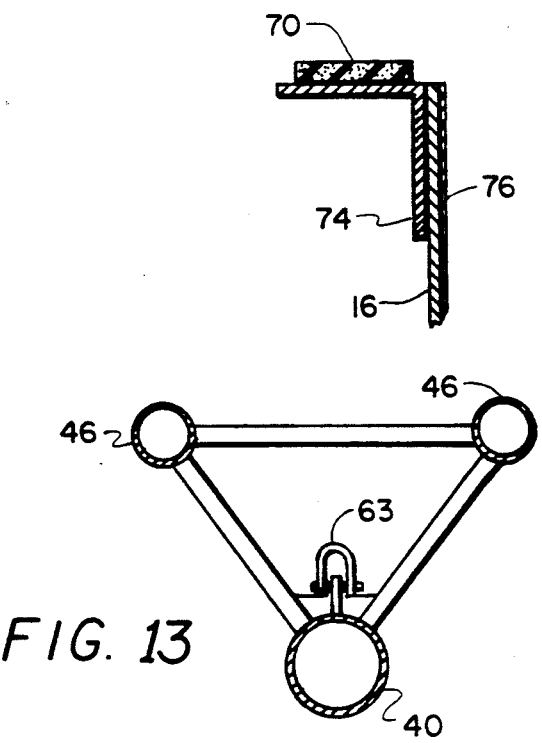
FIG. 12
FIG. 13

PRESSURE SCREEN

This application is a continuation-in-part, of application Ser. No. 07/416,955, filed Oct. 4, 1989 and now abandoned.

1. FIELD OF THE INVENTION

This invention relates to apparatus for separating solids from liquid in a slurry mixture, and more particularly relates to a pressurized screen apparatus for separating out relatively large solids from a slurry in a first stage of building material aggregate reclamation after dredging.

2. PRIOR ART

Apparatus for separating liquid from solids in sand, gravel, etc. reclamation processes, commonly known as de-watering equipment, has heretofore been costly and extensive. A conventional process for such reclamation is usually accomplished by loading the building material aggregate from a stockpile and dumping it into a vibrating screen. The material is then washed and passed through a screw-type de-watering device. This process is slow and is labor and equipment intensive.

Alternative means for such reclamation have been attempted wherein the slurry is deposited into large settling basins and allowed to settle for a period of time. Upon sufficient settlement, large particulate matter is extracted through openings in the bottom of said basins. This process is likewise very time consuming and expensive.

All of the methods and apparatus heretofore utilized in the building material aggregate reclamation industry are expensive. and require a great deal of equipment and manpower.

SUMMARY OF THE INVENTION

In order to improve the state of the art and advance the technology for reclaiming building material aggregate from slurry resulting from dredging operations, the instant invention provides a simple and inexpensive portable pressure screen used in combination with conventional de-watering apparatus.

A conventional hydraulic dredge is used to excavate material from the bottom of a body of water. The slurry thus created includes rocks, sticks and other undesirable materials. The slurry is transported under pressure through conduits to a sealed screen housing where said slurry is passed across a filtering screen allowing smaller matter (ie: sand and water) to pass therethrough. The screen filters out rocks and sticks, etc. The screen is disposed at an angle to horizontal, thereby allowing the effect of gravity along with the pressure within the housing itself to force the larger particulate matter to fall to a lower area within said housing. An openable door connected to said lower portion of said housing is opened when the pressure across the screen as sensed by conventional sensors or increase in line pressure on dredge reaches a predetermined value.

The filtered slurry passes through an outlet of said pressure screen housing and passes via conduits to conventional de-watering apparatus, such as a cyclone.

In slurry filtering systems common in the art, the process of separating larger particulate matter from the liquified slurry is time consuming. By contrast, the door of said housing need only be opened for a few seconds to allow said large particulate matter to exit therethrough. This enables the dredge to work continuously at its maximum production rate. Operations heretofore disclosed may require hours or even days for such separation.

After the slurry passes through the cyclone, the separated water is allowed to return to the body of water and the end sand product is piled ready for use.

The instant invention has potential applicability to the present expensive beach nourishment programs being carried out in many places throughout the world and also in the event of oil spills reaching shorelines. The oil and water slurry can be treated using the pressure screen housing and related apparatus of the instant invention, returning the water to the ocean and the oil to a storage facility.

It is a primary object of the instant invention to provide a system for separating solid particulate matter from a slurry of dredged building material aggregate which allows the dredge to operate virtually continuously to maximize the output thereof.

It is also an object of the instant invention to provide a pressurized screen apparatus which allows for the self-contained rapid separation of unwanted bulk material from a building material aggregate slurry.

It is a further object of the instant invention to provide an apparatus for separating sand and water from larger matter in a slurry using a pressurized screen and housing therefore.

It is a still further object of the present invention to provide a pressure screen and housing wherein said screen and housing may be self-cleaning by simply lifting the dredging head off the floor of the body of water being dredged and pumping straight water through said screen and housing.

In accordance with these and other objects which will be apparent hereinafter, the instant invention will now be described with particular reference to the accompanying drawings.

BRIEF DESCRIPTION OF THE DRAWINGS

FIG. 9 is a detailed cut-away showing a potential configuration for sealing the pressurized housing.

FIG. 10 shows a biasing means for closing the upper half of the pressurized housing in sealing engagement atop the lower half of said pressurized housing.

FIG. 11 shows a hinge means for hinging the upper and lower halves of the pressure screen housing together.

FIG. 12 shows a gasket flange connected to the lower half of the pressure screen housing of FIG. 9.

FIG. 13 is a cross-sectional view taken along lines 13—13 of FIG. 6 of the cyclone outrigger construction.

DETAILED DESCRIPTION OF THE PREFERRED EMBODIMENT

Figure 1:
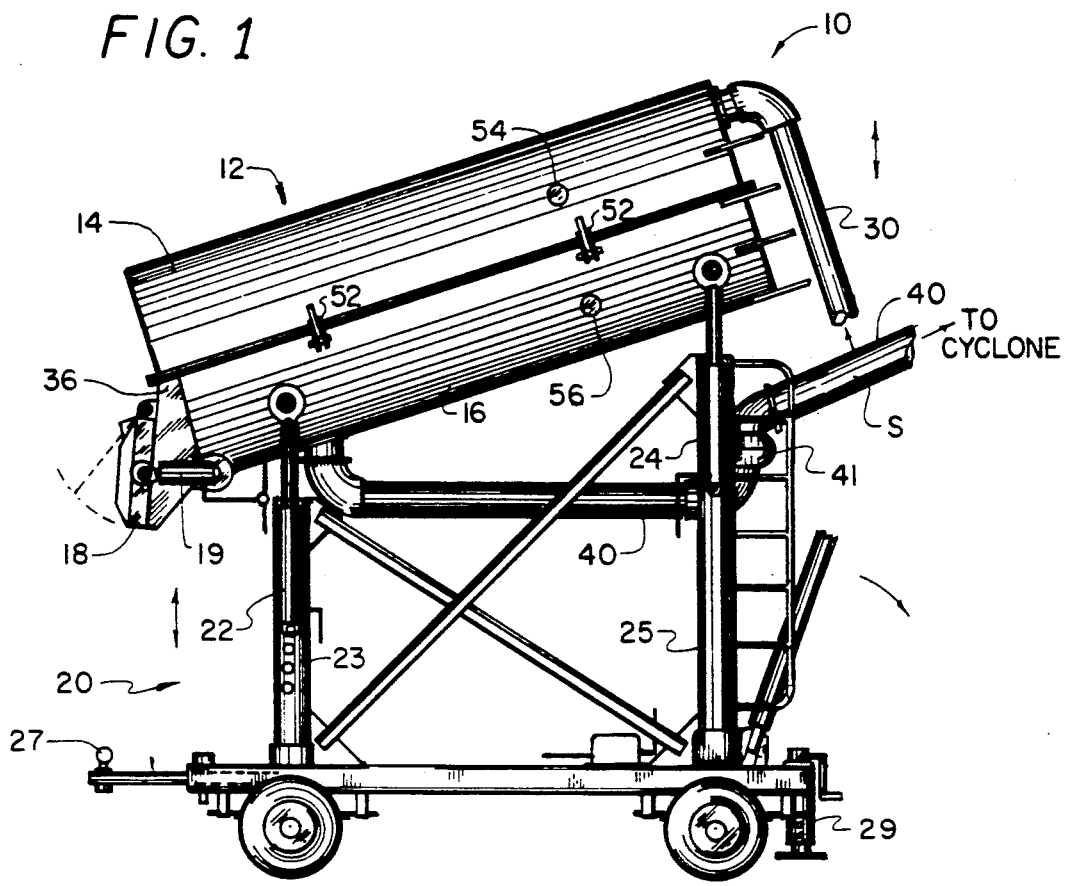
FIG. 1 shows an elevational view of the portable pressure screen housing of the instant invention.
Figure 2:
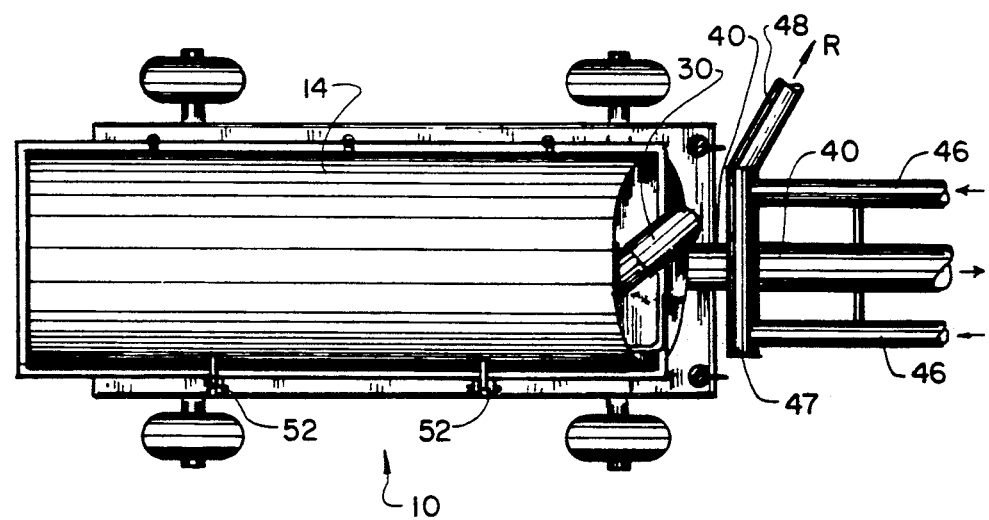
FIG. 2 shows a top plan view of the pressure screen housing of FIG. 1.
Figure 3:
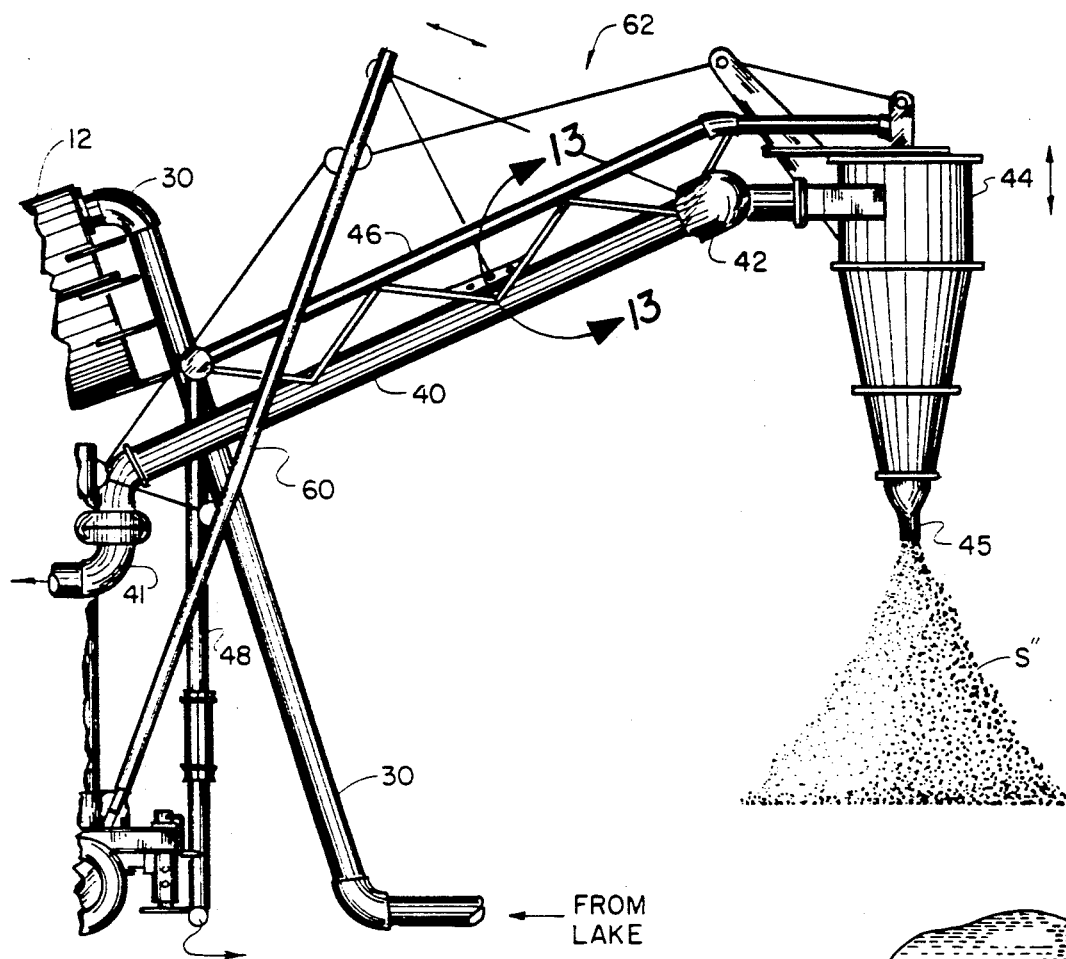
FIG. 3 shows an elevational view of the second stage treatment apparatus of the instant invention including the swingable cyclone and conduit apparatus.
Figure 6:
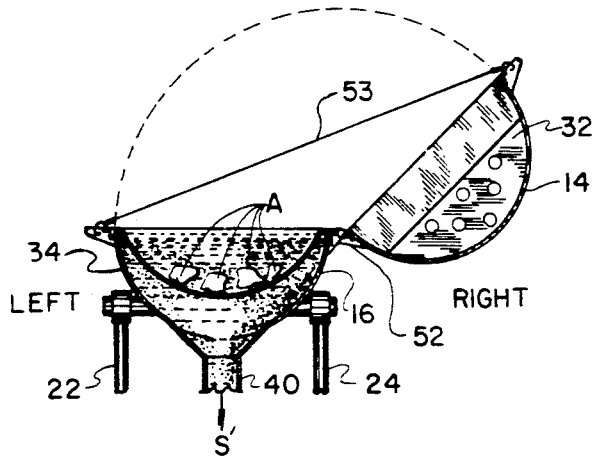
FIG. 6 shows a cut-away view showing the detail of the pressure screen housing interior taken along lines 6—6 of FIG. 5.
Figure 8:
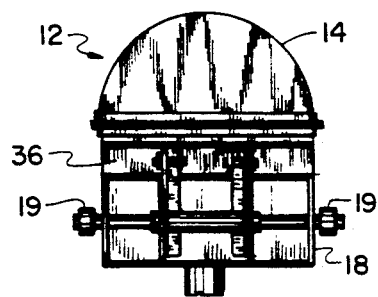
FIG. 8 shows a rear view of the door means for clearing large particulate matter from the interior of said pressure screen housing.
Figure 7:
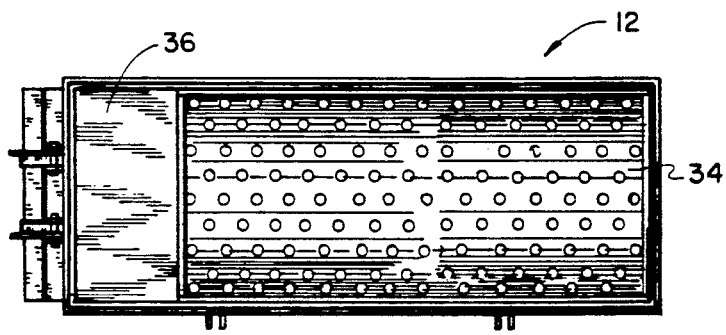
FIG. 7 is a top plan view of the pressure screen housing with the upper half thereof removed.

Referring now to the drawings, FIGS. 1 and 2 show the portable pressure screen apparatus, designated generally by the reference numeral 10, to be comprised of a preferably cylindrically shaped housing member 12 comprised of upper and lower relatively hingable halves 14 and 16, respectively. A support frame means 20 is employed to adjustably support pressure screen housing 12 in a generally tilted attitude as best shown in FIG. 1. Tilting housing 12 causes gravity to draw filtered matter within said housing 12 downwardly due to gravity toward door 18, which is selectively openable or closeable when emptying of the interior of pressure screen 10 is needed. The angle of tilt of housing 12 may be adjusted by moving struts 22 and 24 to raise or lower the rear or front, respectively, of housing 12. In FIG. 1, the front of the housing 12 is to the right and the rear is to the left. An aperture at the end of each said strut 22 and 24 may be aligned as desired with any of a plurality of apertures in legs 23 and 25, respectively, of support means 20. Reference numeral 22 o 24 is used to refer to either of the pair of said adjustable struts 22 and 24 associated with either left or right side of housing 12 as best shown in FIG. 6. Hitch member 27 may be employed in association with support means 20 for towing transport of the screening apparatus 10. Preferably, support jacks or other stabilization means 29 are used in connection with pressure screen apparatus 10 so as to provide the necessary degree of stability and safety while the unit is in operation.

Figure 4:
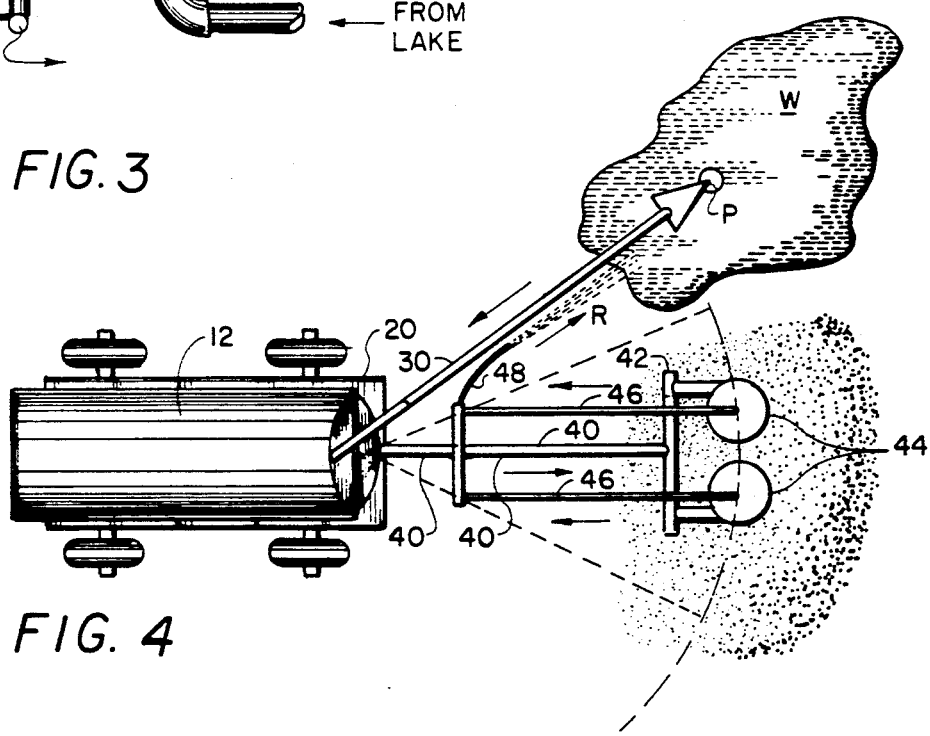
FIG. 4 shows an elevational view of the system of the instant invention.
Figure 5:
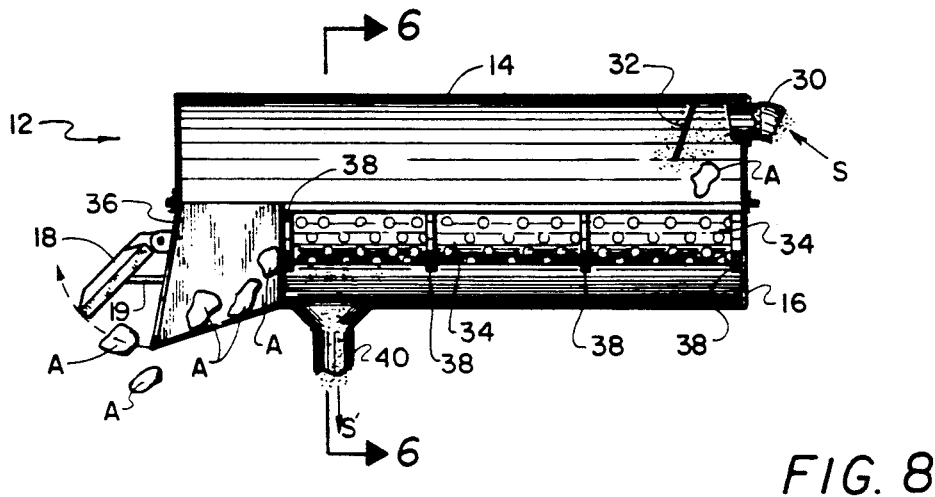
FIG. 5 shows a sectional view of the pressure screen housing of FIG. 1 taken along lines 5—5 of FIG. 2.

As best shown in FIGS. 1, 4 and 5, a slurry S is pumped using pump P from body of water W, such as a lake or the like, to be dredged, through conduit 30 into the interior of pressure screen housing 12. In a typical application, said slurry consists of approximately 20% solids and 80% liquid. Because it is desired to obtain 100% sand in the preferred embodiment, the liquid and larger solids must be removed. To this end, slurry S enters the interior of housing 12 and comes into dissipating contact with a deflector or baffle plate 32. Said plate 32 deflects the flow of slurry S generally downwardly on to filter screen 34 near the front of pressure screen housing 12 so that the slurry S to be filtered will move downwardly, from right to left in FIG. 5, across the entire length of screen 34. In this way, slurry S is exposed to the maximum amount of filtration across the screen 34 as the heavier particulate matter A moves downwardly as a result of gravity and the internal pressure of housing 12 toward collection box 36. Once a sufficient amount of particulate matter A accumulates in box 36, door 18 can be opened through activation of hydraulic cylinders or other opening means 19 connected between box 36 and door 18, and particulate matter A is permitted to fall out of said box 36.

As this clearing operation of matter A takes only a few seconds, the filtering operation can continue uninterrupted.

Screen 34 is generally curved in cross-section as best shown in FIG. 6 and is held in place by supporting ribs 38, which are mounted to lower pressure screen housing half 16.

Deflector plate 32 is preferably perforated so as to allow a portion of slurry S to pass therethrough but while still causing the larger matter A to deflect thereoff onto the upper portion of screen 34 in the vicinity of deflector plate 32.

The filtered slurry S' exits pressure screen housing 12 through an aperture at the bottom thereof connected to discharge conduit 40. Slurry S' travels through conduit 40 under pressure through rotatable coupling 41 and thereafter against gravity to manifold 42 which divides the flow of slurry S' into, in the instant embodiment, a pair of separators 44, commonly known as cyclones or some other separating device. Additional water is extracted from the slurry S' so that the discharge S" from said cyclones is approximately 85% solid, 15% water.

The water extracted from slurry S' in cyclones 44 travels through return conduits 46 into return manifold 47 and is thereafter transferred through return conduit 48 to, preferably, the body of water from which it was required. As is to be appreciated from FIG. 4, the discharge S" of cyclones 44 can be distributed across an area defined by the arc through which the cyclone/conduit apparatus swings. Coupling 41, which is interposed along conduit 40, allows the apparatus comprising the cyclone and conduits to rotate relative to pressure screen housing 12 to distribute an even greater amount of material S" before it must be transported away.

Housing 12 is comprised of upper and lower halves 14 and 16, respectively, which are hinged relative to each other about hinge 52. Cable means 53 may be employed to support upper half 14 relative to lower half 16 when access to the interior of housing 12 is desired, as for routine maintenance procedures.

Housing 12 further comprises a pair of pressure sensing means 54 and 56 associated with upper and lower halves 14 and 16, respectively, of housing 12. As material A builds up within housing 12, and particulate matter clogs screen 34, the pressure above the screen will increase relative to the pressure below the screen. This pressure differential is sensed by sensing means 56. When the pressure differential reaches a predetermined value, hydraulic cylinders 19 are activated, either manually or automatically, to open door 18 and expel filtered material A from housing 12.

As best shown in FIG. 13, conduit 40 and water return conduits 46 are interconnected in truss-like fashion to impart the greatest structural rigidity and strength to the cyclone/conduit apparatus. The conduits 40 and 46 are supported by means of swingable boom means 60 with which is associated a supporting cable arrangement 62. The cyclone 44/conduit 40, 46 arrangement may be moved from side to side to distribute the discharge material S" from cyclones 44. It should be noted that the discharge end 45 of cyclones 44 should be at a predetermined vertical height above the discharge end of conduit 48 in order for said cyclones 44 to function properly, as they work on a syphon principal. To this end, as mentioned above.

Cable securement means such as U-hook 63 of FIG. 13 or the like may be utilized as attachment means between support cable structure 62 and cyclone/conduit structure.

In use, housing 12 is preferably sealed against leakage by means of gaskets 70 connected to L-shaped flange means 72, 74, respectively, continuous lengths of which are connected to upper and lower housing halves 14 and 16. Any suitable sealing means may be utilized, including 0-rings or interfitting channels about housing 12.

As best shown in FIG. 10, upper housing half 14 may be releasably secured to lower housing half 16 by means of any convenient clamping means, such as threaded rod 82 with handle 8 threadably engageable within a female receiving element 83. Threaded rod 82 may be passed through aligned apertures in extensions 84 of flanges 72 and 74 so as to provide for the proper registration of flanges 72 and 74 with gasket 70.

The periphery of the interior of pressure screen housing may be lined with a material 76 having a strong resistance to abrasion. Suitable material might be, for example, but not by way of limitation, a rubber abrasive material.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. In a dredge slurry system comprised of a pressurized slurry transfer means and a filtering means for screening large particulate matter therefrom, the improvement comprising: a separate, portable, pressurized screening apparatus for filtering of large particulate matter during slurry transfer, said screening apparatus comprising a hollow elongated generally cylindrical housing having an inlet means; a means for deflecting incoming slurry onto a screen; a discharge; a means for adjusting the orientation of said housing relative to the horizontal; said screen extending along at least a portion of said cylindrical housing disposed between said inlet means and said discharge dividing said cylindrical housing into an upper chamber and a lower chamber; a particulate matter discharge port having a means for discharging screened particulate matter; and means for transporting said screening apparatus from one location to another; wherein pressurized slurry is directed through said inlet means into the upper chamber and deflected to said screen whereby particulate matter separated out of the slurry remains in the upper chamber for discharge through said particulate matter discharge port and screened slurry passing through said screen into the lower chamber is forced through said discharge, the orientation of said cylindrical housing being adjustable to maximize the exposure of said slurry upon said screen.

2. The improvement according to claim 1, wherein said screen is further defined as a plurality of through-openings.

3. The improvement according to claim 1, wherein said means for discharging comprises a door operatively associated with said cylindrical housing, said door hingedly connected to said housing and swingable into and out of sealing engagement with said particulate matter discharge port.

4. The improvement according to claim 3, further including a means for automatically opening said door based upon a predetermined pressure differential between the upper and lower chambers.

5. The improvement according to claim 4, wherein said means for automatically opening is a hydraulic ram drivingly connected to said door.

6. The improvement according to claim 1 wherein said means for transporting is comprised of a plurality of wheels connected to a frame which in turn is connected to the screening apparatus.

7. A method of filtering dredge slurry using a slurry transfer means in which a separate, portable, adjustable pressurized screening apparatus is provided comprised of a screening apparatus having a hollow elongated generally cylindrical housing said housing having an inlet with a deflector plate; a means for adjusting said housing relative to the horizontal; a discharge; a screen extending along at least a portion of said cylindrical housing disposed between said inlet and said discharge attached to and dividing the interior of said cylindrical housing into an upper chamber and a lower chamber; means for transporting said screening apparatus; and, a particulate matter discharge port having a means for discharging screened particulate matter, the method comprising;
  (a) transporting said screening apparatus to a sludge dredging locale;
  (b) coupling said inlet of said screening apparatus to a slurry transfer means, pressurizing the slurry transfer means and directing the pressurized slurry into the screening apparatus;
  (c) deflecting the pressurized slurry onto said screen of said upper chamber;
  (d) directing the slurry through said screen to said discharge of said lower chamber;
  (e) monitoring the pressure differential between the upper chamber and the lower chamber;
  (f) opening the particulate discharge port when the pressure differential of step (e) reaches a predetermined value;
  (g) adjusting the angle of the cylindrical housing relative to the horizontal to reduce the interval between the occurrence of step(e) and step (f).

* * * * *